(12) United States Patent
Luo et al.

(10) Patent No.: US 10,605,435 B2
(45) Date of Patent: Mar. 31, 2020

(54) LIGHT DISTRIBUTION ELEMENT FOR LIGHT EMITTING DEVICE AND LIGHT EMITTING DEVICE

(71) Applicant: VALEO VISION, Bobigny (FR)

(72) Inventors: Ji Luo, Wuhan (CN); Ciling Zhang, Wuhan (CN); Long Wang, Wuhan (CN); Pingwu Yang, Wuhan (CN)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/125,442

(22) Filed: Sep. 7, 2018

(65) Prior Publication Data

US 2019/0107267 A1    Apr. 11, 2019

(30) Foreign Application Priority Data

Sep. 8, 2017    (CN) .......................... 2017 1 0811209

(51) Int. Cl.
| | |
|---|---|
| *F21V 14/06* | (2006.01) |
| *F21S 43/20* | (2018.01) |
| *F21S 41/63* | (2018.01) |
| *F21S 41/20* | (2018.01) |
| *G02B 26/08* | (2006.01) |

(Continued)

(52) U.S. Cl.
CPC ............ *F21V 14/06* (2013.01); *F21S 41/285* (2018.01); *F21S 41/635* (2018.01); *F21S 43/26* (2018.01); *G02B 3/0043* (2013.01); *G02B 27/2214* (2013.01); *G02B 3/0062* (2013.01); *G02B 3/0068* (2013.01); *G02B 26/0875* (2013.01)

(58) Field of Classification Search
None
See application file for complete search history.

(56) References Cited

U.S. PATENT DOCUMENTS

| | | | | |
|---|---|---|---|---|
| 2009/0002664 A1* | 1/2009 | Tanitsu | ................ | G02B 3/0062 355/67 |
| 2013/0229653 A1* | 9/2013 | Tatsuta | ............... | G02B 27/0905 356/328 |

(Continued)

FOREIGN PATENT DOCUMENTS

| | | |
|---|---|---|
| EP | 2 110 689 A1 | 10/2009 |
| EP | 3 173 683 A1 | 5/2017 |

(Continued)

OTHER PUBLICATIONS

European Search Report and Written Opinion of the International Searching Authority dated Nov. 29, 2018 in 18 192 085.1, 8 pages.

*Primary Examiner* — Ashok Patel
(74) *Attorney, Agent, or Firm* — Oblon, McClelland, Maier & Neustadt, L.L.P.

(57) ABSTRACT

A light distribution element for a light emitting device, including a plurality of first light deflecting portions and a plurality of second light deflecting portions, wherein a pattern formed by the plurality of first light deflecting portions is superposed with a pattern formed by the plurality of second light deflecting portions to form a final display pattern. The present invention also provides a light emitting device including the light distribution element. According to the light distribution element and the light emitting device provided by the present invention, it is possible to generate a personalized, three-dimensional, dynamic lighting effect.

20 Claims, 7 Drawing Sheets

(51) Int. Cl.
*G02B 27/22* (2018.01)
*G02B 3/00* (2006.01)

(56) References Cited

U.S. PATENT DOCUMENTS

| | | |
|---|---|---|
| 2015/0036313 A1* | 2/2015 | Ookubo .............. G02B 6/0061 362/19 |
| 2015/0370080 A1* | 12/2015 | Meacham .............. G03B 21/60 353/7 |
| 2016/0265733 A1 | 9/2016 | Bauer et al. |
| 2016/0320627 A1 | 11/2016 | Chen et al. |
| 2017/0146212 A1 | 5/2017 | Jo et al. |
| 2017/0292682 A1 | 10/2017 | Sepkhanov |
| 2017/0349095 A1 | 12/2017 | Wimmer et al. |
| 2018/0231210 A1 | 8/2018 | Nakamura et al. |

FOREIGN PATENT DOCUMENTS

| | | |
|---|---|---|
| EP | 3 364 098 A1 | 8/2018 |
| JP | 2010-177064 A | 8/2010 |
| JP | WO 2017/065193 A1 | 4/2017 |
| WO | WO 03/038335 A1 | 5/2003 |
| WO | WO 2015/058227 A1 | 4/2015 |
| WO | WO 2016/050710 A1 | 4/2016 |
| WO | WO 2016/071063 A1 | 5/2016 |

* cited by examiner

LIGHT DISTRIBUTION ELEMENT FOR LIGHT EMITTING DEVICE AND LIGHT EMITTING DEVICE

BACKGROUND

Technical Field

The present invention relates to a technical field of vehicle device or light emitting device, and more particularly, to a light distribution element for a light emitting device and a light emitting device including the light distribution element.

Description of the Related Art

A light emitting device of a motor vehicle includes various lighting and/or signaling devices, such as a headlight, fog light, turn light, brake light, position light, daytime running light, and the like of the vehicle. With the development of the automotive industry, people's requirements for functional devices on the vehicles are not limited to their own functions, but more and more attentions are paid to aesthetic and unique design in addition to the functionality. Automobile manufacturers make the pursuit of personalized design of lighting and/or signaling devices, including the personalization of lighting effects, the special style of lighting patterns, and they further pursue for three-dimensional and dynamic lighting effects.

In existing lighting and/or signaling devices for motor vehicles, there is also a lack of devices capable of patterning light emitted from the lighting and/or signaling devices and forming a pattern having a three-dimensional or dynamic optical effect, in particular in a simple manner.

SUMMARY

In order to at least partially overcome the drawbacks in the prior art, the present invention provides a light distribution element for a light emitting device and a light emitting device that is capable of generating a personalized lighting pattern.

The present invention is further intended to provide a light distribution element for a light emitting device and a light emitting device having a stereoscopic lighting effect.

The present invention is still intended to provide a light distribution element for a light emitting device and a light emitting device capable of generating a dynamic lighting effect.

The present invention is further still intended to provide a light distribution element for a light emitting device and a light emitting device that can realize a personalized lighting pattern, a stereoscopic lighting effect, or a dynamic lighting effect in a simple, cost-effective manner.

In order to achieve at least one of the above objectives, technical solutions of the present invention are provided as follows:

A light distribution element for a light emitting device, comprising a plurality of first light deflecting portions and a plurality of second light deflecting portions, wherein a pattern formed by the plurality of first light deflecting portions is superposed with a pattern formed by the plurality of second light deflecting portions to form a final display pattern.

According to a preferred embodiment of the present invention, the first light deflecting portions are constructed to be a plurality of petal-shaped convexes protruding towards an outside of the light distribution element, and the plurality of petal-shaped convexes extend radially outwardly from a middle of the light distribution element, and the second light deflecting portions are constructed to be a plurality of annular convexes protruding towards the outside of the light distribution element, the plurality of annular convexes have different perimeters, and the annular convex having a larger perimeter is provided outside the annular convex having a smaller perimeter.

According to a preferred embodiment of the present invention, the plurality of first light deflecting portions are arranged in an annular region, and the plurality of petal-shaped convexes extend from an inner ring of the annular region to an outer ring of the annular region, respectively.

According to a preferred embodiment of the present invention, the light distribution element has a light entrance side and a light exit side parallel to the light entrance side, and the plurality of first light deflecting portions are formed on the light entrance side of the light distribution element, and the plurality of second light deflecting portions are formed on the light exit side of the light distribution element; or the plurality of first light deflecting portions are formed on the light exit side of the light distribution element, and the plurality of second light deflecting portions are formed on the light entrance side of the light distribution element.

According to a preferred embodiment of the present invention, profiles of the light entrance side and the light exit side are circular, and projections of the plurality of petal-shaped convexes on a plane where the light entrance side or the light exit side is located are distributed uniformly at equiangular intervals.

According to a preferred embodiment of the present invention, the projection of the petal-shaped convex on the plane where the light entrance side or the light exit side is located is symmetrical or asymmetrical itself.

According to a preferred embodiment of the present invention, a height of each petal-shaped convex at the inner ring in a direction in which the each petal-shaped convex protrudes towards the outside of the light distribution element is different from a height of each petal-shaped convex at the outer ring in the direction in which the each petal-shaped convex protrudes towards the outside of the light distribution element.

According to a preferred embodiment of the present invention, the height of each petal-shaped convex between the inner ring and the outer ring in the direction in which the each petal-shaped convex protrudes towards the outside of the light distribution element gradually changes.

According to a preferred embodiment of the present invention, a height of each annular convex having a larger perimeter in a direction in which the each petal-shaped convex protrudes towards the outside of the light distribution element is different from a height of each annular convex having a smaller perimeter in the direction in which the each annular convex protrudes towards the outside of the light distribution element.

According to a preferred embodiment of the present invention, profiles of the light entrance side and the light exit side are circular, and the heights of the plurality of annular convexes in the direction in which the annular convexes protrude towards the outside of the light distribution element gradually change in a radially outward direction from a circle center of the light entrance side or the light exit side.

According to a preferred embodiment of the present invention, the plurality of first light deflecting portions and the plurality of second light deflecting portions are integrally formed with a main body of the light distribution element, and the plurality of first light deflecting portions and the plurality of second light deflecting portions are respectively disposed on a side of the main body of the light distribution element facing a light source and another side of the main body of the light distribution element facing away from the light source.

According to a preferred embodiment of the present invention, the plurality of first light deflecting portions and the plurality of second light deflecting portions are constructed to be members independent of the main body of the light distribution element.

According to a preferred embodiment of the present invention, the plurality of first light deflecting portions and the plurality of second light deflecting portions are respectively constructed to be a lenticular grating film.

According to a preferred embodiment of the present invention, the plurality of first light deflecting portions and the plurality of second light deflecting portions are configured to be movable with respect to each other.

According to a preferred embodiment of the present invention, the plurality of first light deflecting portions and the plurality of second light deflecting portions are configured to be translatable with respect to each other, so that a distance between the plurality of first light deflecting portions and the plurality of second light deflecting portions is changeable.

According to a preferred embodiment of the present invention, the plurality of first light deflecting portions and the plurality of second light deflecting portions are configured to be rotatable with respect to each other.

According to another aspect of the present invention, there is provided a light emitting device, comprising the light distribution element according to any one of the above embodiments.

The light distribution element for the light emitting device according to the present invention includes a plurality of first light deflecting portions and a plurality of second light deflecting portions, and a pattern formed by the plurality of first light deflecting portions and a pattern formed by the plurality of second light deflecting portions are different from each other. The first light deflecting portions and the second light deflecting portions may be constituted by lenticular gratings, which is capable of generating a personalized lighting pattern. For example, by means of constructing the first light deflecting portion to be a radially arranged petal-shaped convex and constructing the second light deflecting portion to be an annular, a petal-like (radial) lighting pattern can be generated. Due to the use of the lenticular gratings, the formed pattern can have a three-dimensional stereoscopic effect. Further, according to the light distribution element provided by the present invention, the first light deflecting portion and the second light deflecting portion can be configured to move with respect to each other, and accordingly the formed pattern changes dynamically during the movement. Therefore, by using the light distribution element provided by the present invention, the light emitting device can generate a dynamic lighting effect.

In the present invention, a personalized lighting pattern, a stereoscopic lighting effect or a dynamic lighting effect can be simply realized by using differently constructed light deflecting portions, and the technical means is simple and cost-effective.

DETAILED DESCRIPTION OF PREFERRED EMBODIMENTS

Figure 1:
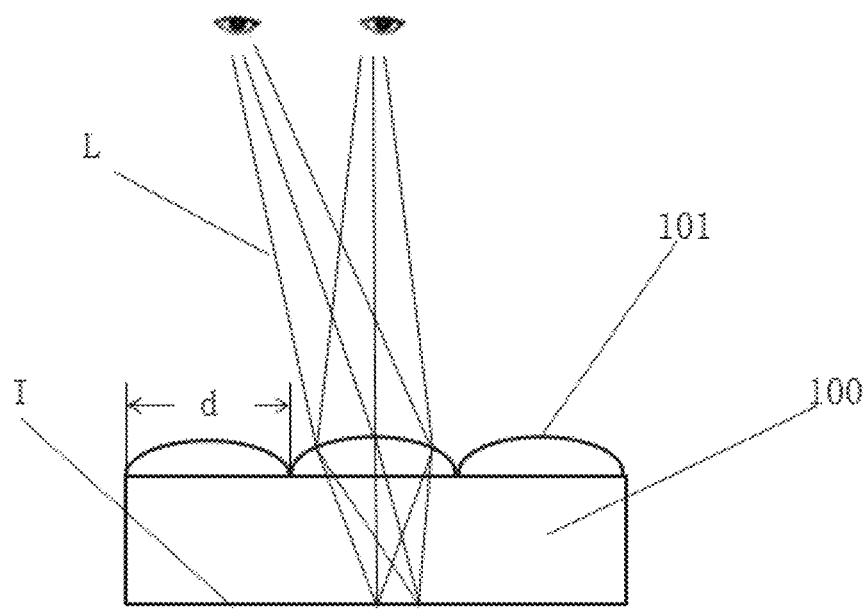
FIG. 1 is a schematic principle diagram of a lenticular grating.

Exemplary embodiments of the present invention will be described in detail below with reference to the accompanying drawings in which the same or similar reference numerals represent the same or similar elements. In addition, in the following detailed description, numerous specific details are set forth in order to facilitate the explanation and provide a thorough understanding of the embodiments of the present disclosure. However, it will be apparent that one embodiment or more embodiments may also be practiced without these specific details. In other cases, well-known structures and devices are schematically illustrated to simplify the drawings.

Figure 2:
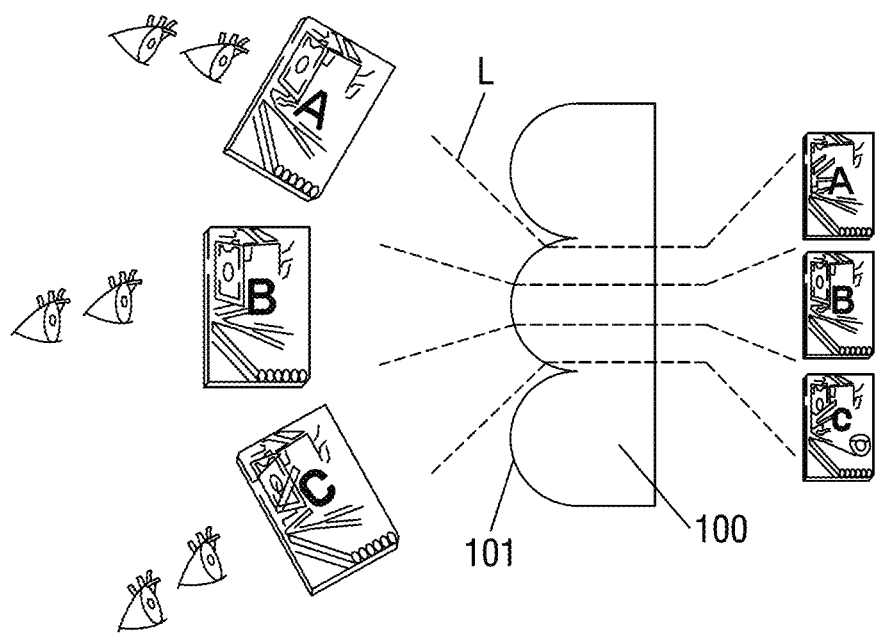
FIG. 2 is another schematic principle diagram of a lenticular grating.

The present invention is based on an innovative use of lenticular gratings, which are generally used to generate a stereoscopic pattern. FIG. 1 shows the principle of the lenticular grating. In FIG. 1, the lenticular grating 100 comprises a plurality of convexes 101 arranged in parallel. A width of the convex can be defined as a grating pitch d. As shown in FIG. 1, light L emitted by an image I is refracted by a grating lens, and then human eyes receive different images I refracted by the grating lens from different angles, so the contents observed by the human eyes are different at different positions in front of the image I. Such an effect can be utilized to generate stereoscopy of pattern. Further, FIG. 2 also shows the principle of the lenticular grating. In FIG. 2, the lenticular grating 100 includes a plurality of convexes 101 arranged in parallel, and an image behind the lenticular grating 100 includes three parts: A, B, and C. Light L is refracted by the lenticular grating 100, and the human eyes can simultaneously receive the three parts of the image, but the relative positions of the three parts A, B, and C are changed, thereby the lenticular grating 100 can be utilized to generate a 3D stereoscopic feeling.

Figure 3:
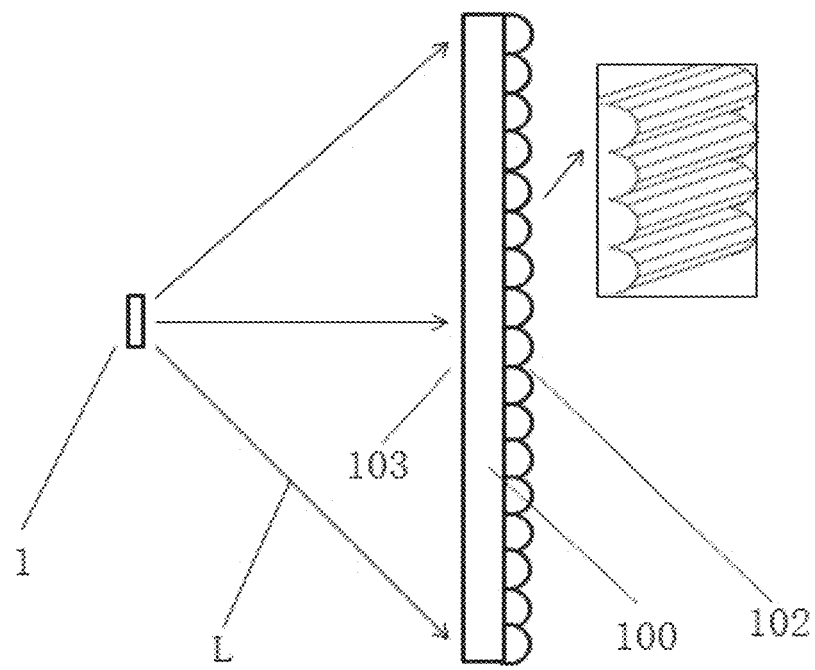
FIG. 3 is a schematic view of a double-sided grating according to an embodiment of the present invention.
Figure 4:
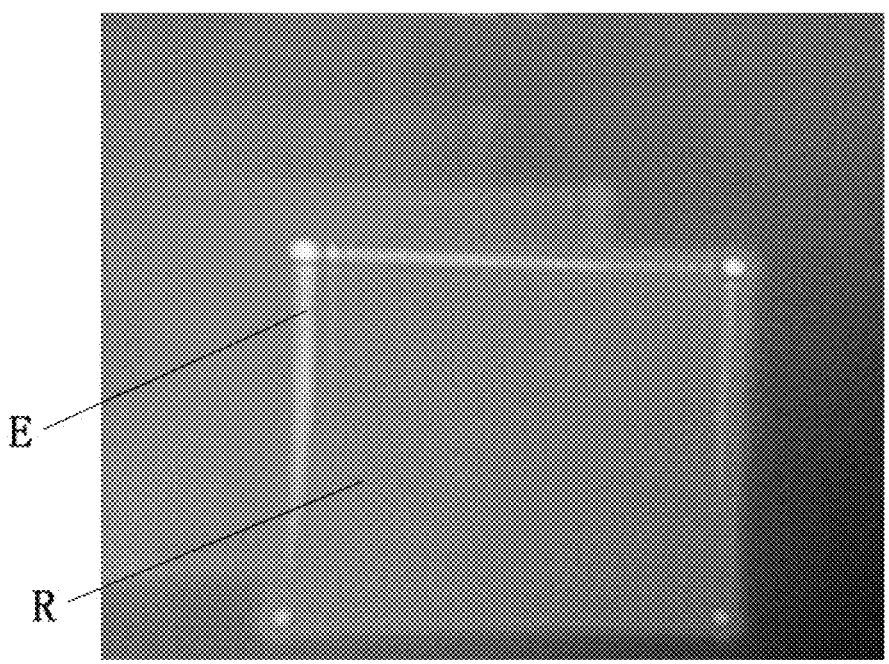
FIG. 4 is a lighting effect diagram of the double-sided grating shown in FIG. 3.

For a point light source, a lenticular grating with gratings on one side will generate several light strips. If the gratings are formed on both sides of the lenticular grating, the light refracted by the first side is further scattered on the second side, which will generate complicated lighting effect. FIG. 3 is a schematic view of a double-sided grating according to an embodiment of the present invention, and FIG. 3 shows a lenticular grating 100 having convex structures on both sides thereof, it has a plurality of parallel vertical convexes 103 on a light entrance side of the lenticular grating 100 and a plurality of parallel horizontal convexes 102 on a light exit side of the lenticular grating 100, that is, the grating patterns on the light entrance side and the light exit side are orthogonal. Since FIG. 3 is a cross-sectional view along an extending direction of the vertical convex 103, the convex structure is not shown in the cross-sectional view. The light L emitted by a light source 1 is refracted by the double-sided grating to generate a luminous surface, that is, to generate a region with the luminous surface, as shown in FIG. 4. FIG. 4 shows a lighting effect diagram of the double-sided grating shown in FIG. 3, and a lighting region R surrounded by a lighting boundary E in the form of a surface illumination can be seen in the figure. It should be noted that, in the embodiment shown in FIG. 3, the patterns of the gratings on two sides are the same.

Figure 5:
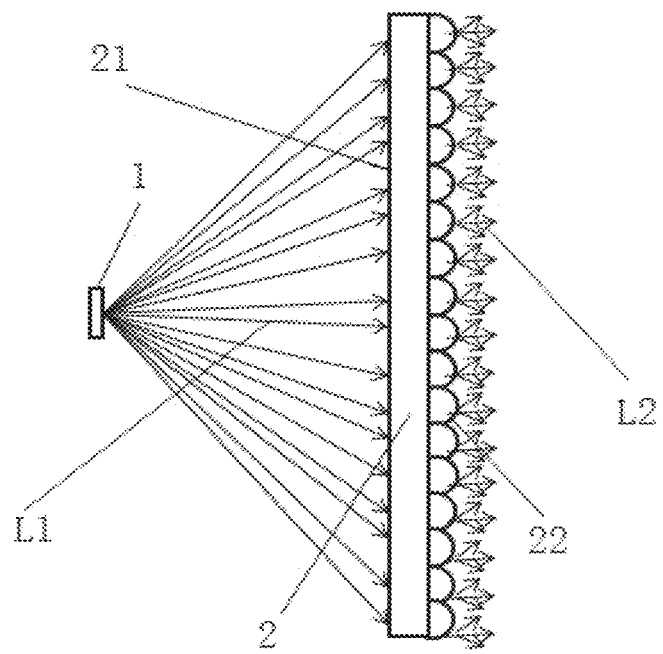
FIG. 5 is a schematic view of a light distribution element for a light emitting device according to an embodiment of the present invention.

FIG. 5 shows a light distribution element for a light emitting device according to an embodiment of the present invention. In FIG. 5, the light distribution element 2 includes a plurality of petal-shaped convexes 21 and a plurality of annular convexes 22. The petal-shaped convexes 21 protrude towards an outside of the light distribution element 2, the annular convexes 22 protrude towards an outside of the light distribution element 2, and the pattern formed by the plurality of petal-shaped convexes 21 is significantly different from the pattern formed by the plurality of annular convexes 22. Since FIG. 5 shows a cross-sectional view along an extending direction of the petal-shaped convexes 21, the convex structures are not shown in the cross-sectional view. The petal-shaped convexes 21 serve as the first light deflecting portion for deflecting light beams, and the annular convexes 22 serve as the second light deflecting portion for deflecting the light beams.

As shown in FIG. 5, the light distribution element 2 has a light entrance side close to the light source 1 and a light exit side parallel to the light entrance side, and profiles of the light entrance side and the light exit side are circular. The plurality of first light deflecting portions are formed on the light entrance side of the light distribution element 2, and the plurality of second light deflecting portions are formed on the light exit side of the light distribution element 2. The plurality of first light deflecting portions are respectively configured for receiving different portions of an incident light beam L1 from the outside of the light distribution element 2 and deflecting them toward the second light deflecting portions, and the plurality of second light deflecting portions are respectively configured for deflecting different portions of the light beam deflected by the plurality of first light deflecting portions to form a lighting pattern P. However, the present invention is not limited thereto. Alternatively, the plurality of first light deflecting portions may be formed on the light exit side of the light distribution element 2, and the plurality of second light deflecting portions may be formed on the light entrance side of the light distribution element 2. The plurality of second light deflecting portions are respectively configured for receiving different portions of the incident light beam L1 from the outside of the light distribution element 2 and deflecting them toward the first light deflecting portions, and the plurality of first light deflecting portions are respectively configured for deflecting different portions of the light beam deflected by the plurality of second light deflecting portions to form a lighting pattern.

The light source 1 may be any light source known from the prior art, preferably a light emitting diode. The light source 1 may comprise one light emitting diode or an array of light emitting diodes. The light source 1 may be supported by any component known in the prior art for carrying a light source, such as a lamp holder, a printed circuit board or the like.

Figure 6:
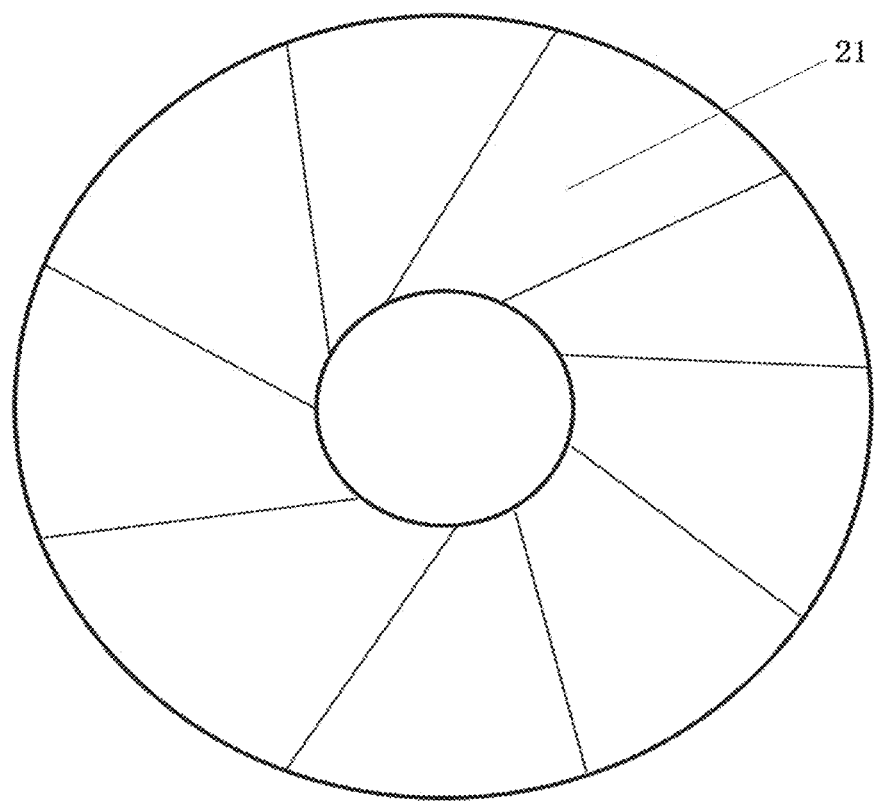
FIG. 6 is a schematic view of petal-shaped convexes of a light distribution element for a light emitting device according to an embodiment of the present invention.
Figure 7:
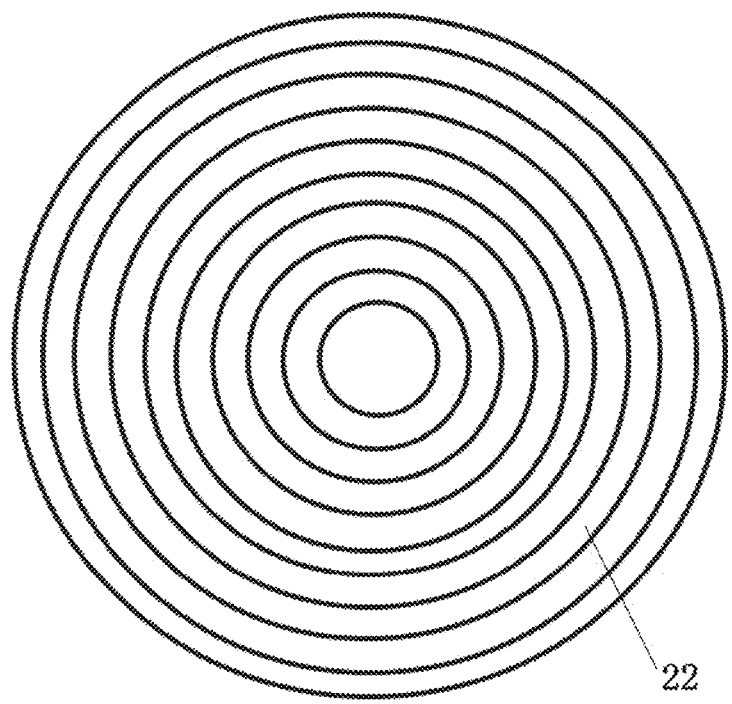
FIG. 7 is a schematic view of annular convexes of a light distribution element for a light emitting device according to an embodiment of the present invention.

As for the arrangement of the petal-shaped convexes 21 and the annular convexes 22, reference may be made to FIGS. 6 and 7. The plurality of petal-shaped convexes 21 extend radially outwardly from a middle of the light distribution element 2, and the plurality of annular convexes 22 have different perimeters, and the annular convex 22 having a larger perimeter is provided outside the annular convex 22 having a smaller perimeter. That is, the plurality of petal-shaped convexes 21 are radially arranged, and the plurality of annular convexes 22 are annularly arranged.

The light distribution element for the light emitting device according to the present invention includes a plurality of first light deflecting portions and a plurality of second light deflecting portions, and a pattern formed by the plurality of first light deflecting portions and a pattern formed by the plurality of second light deflecting portions are different from each other. The first light deflecting portions and the second light deflecting portions may be constituted by lenticular gratings, which is capable of generating a personalized lighting pattern. For example, by means of constructing the first light deflecting portion to be a radially arranged petal-shaped convex and constructing the second light deflecting portion to be an annular, a petal-like (radial) lighting pattern can be generated (this lighting pattern will be described below). Due to the use of the lenticular gratings, the formed pattern can have a three-dimensional stereoscopic effect. In addition, the light distribution element according to the present invention has a relatively high light efficiency, and the luminous flux ratio exceeds 25%.

Advantageously, the plurality of petal-shaped convexes 21 are arranged in an annular region, the plurality of petal-shaped convexes 21 extend from an inner ring of the annular region to an outer ring of the annular region, respectively, and projections of the plurality of petal-shaped convexes 21 on a plane where the light entrance side or the light exit side is located are distributed uniformly at equiangular intervals, but the projection of the petal-shaped convex 21 on the plane where the light entrance side or the light exit side is located is asymmetrical itself, that is, the plurality of petal-shaped convexes 21 twist around a center of circle of the light entrance side or the light exit side and the angle of twist at the outer ring is greater than the angle of twist at the inner ring. Its asymmetrical design facilitates generating a rotary lighting pattern which will be described later. Alternatively, the projection of the petal-shaped convex 21 on the plane where the light entrance side or the light exit side is located may be symmetrical itself, which will result in a central rotationally symmetrical lighting pattern.

It should be noted that, the petal-shaped convex in the present invention has a protruding surface and the projection of the petal-shaped convex in the protruding direction has a petal-shaped profile. The petal-shaped profile means that the profile is surrounded by four straight lines or curves, and two opposite straight lines or curves have different side lengths. The petal-shaped profile of the present invention is not limited to a strict or symmetrical petal shape, but also includes an approximate petal shape and an asymmetrical petal shape, as long as it exhibits a petal shape in a general sense. Referring to FIG. 6, the petal-shaped convex 21 presents an approximately petal-shaped profile on the paper plane while the petal-shaped convex 21 protrudes toward the outside of the paper plane.

Figure 8:
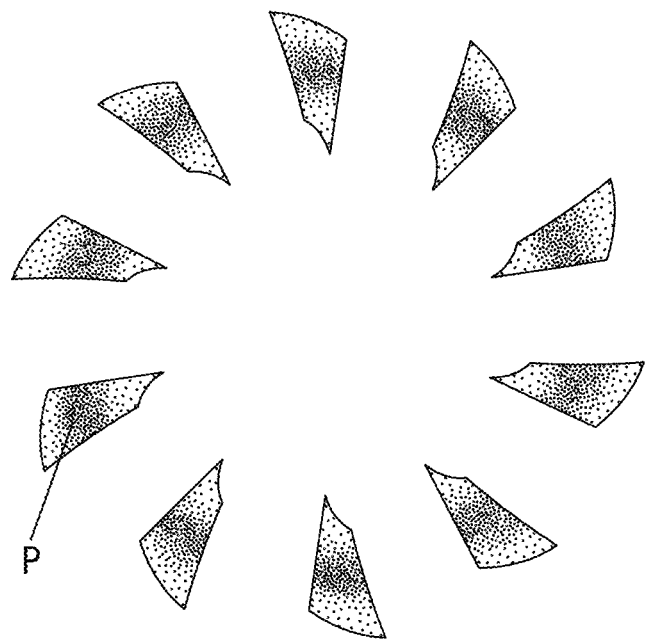
FIG. 8 is a lighting effect diagram of a light distribution element for a light emitting device according to an embodiment of the present invention.

The lighting effect of the light distribution element for the light emitting device according to the embodiment of the present invention can be described with reference to FIG. 8. As can be seen from the figure, after the light source 1 is light-distributed by the light distribution element 2, a radial or petal-shaped lighting pattern may be generated, and each of the petals of the lighting pattern P is slightly twisted with respect to the center of circle, therefore the lighting pattern P appears to have a rotating effect. The lighting effect of such a lighting pattern is very beautiful and special, and is very suitable for tail lights, brake lights, turn lights, fog lights or reverse lights of motor vehicles.

Figure 9:
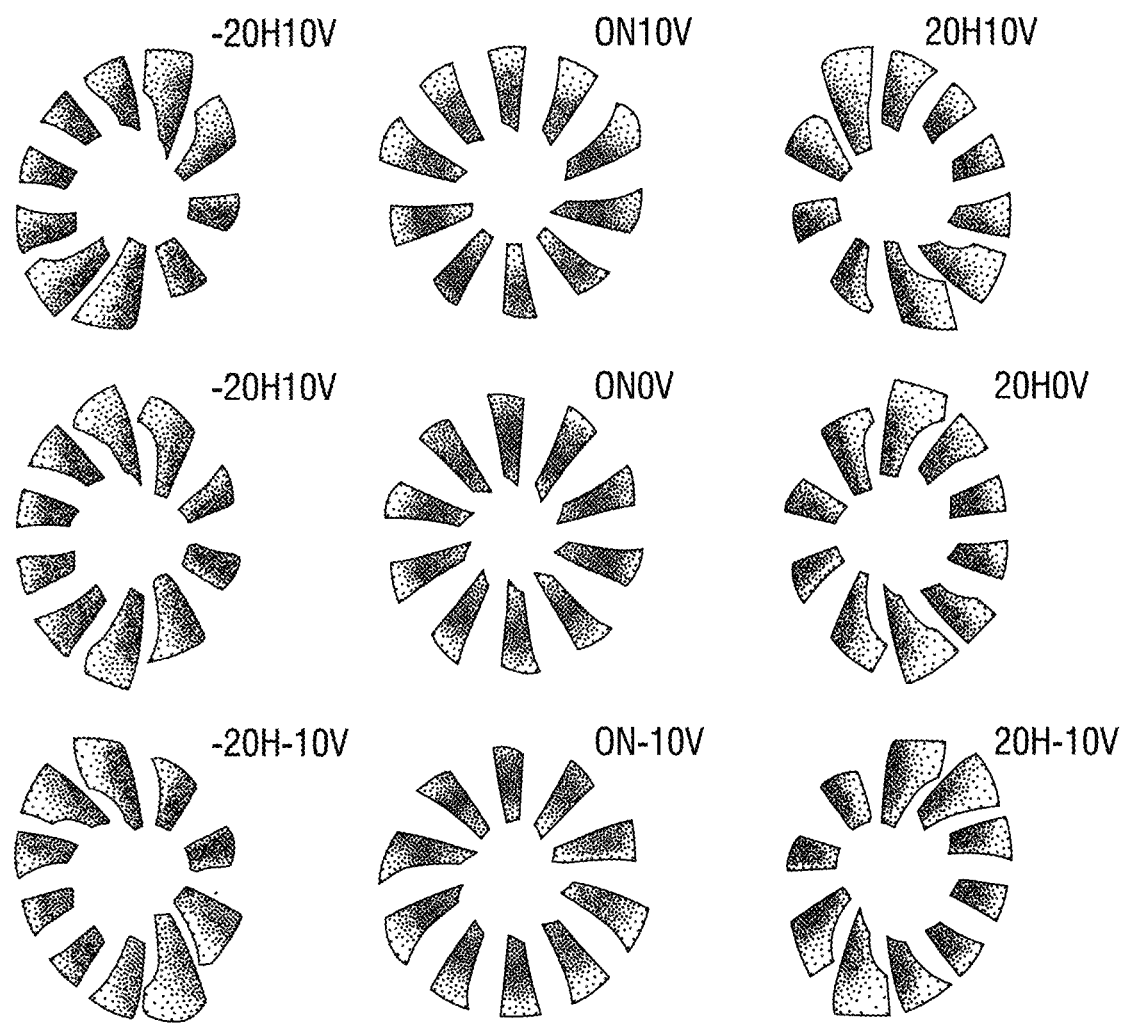
FIG. 9 is a comparison diagram of lighting effects of a light distribution element for a light emitting device according to an embodiment of the present invention as viewed from different angles.

In addition, the above lighting patterns P are different in visual effect as viewed from different angles, and FIG. 9 is a comparison diagram of lighting effects of a light distribution element for a light emitting device according to an embodiment of the present invention as viewed from different angles, in which lighting patterns viewed from nine directions are shown, where −20H10V refers to viewing at −20 degrees with respect to a vertical plane passing through the center of the light distribution element and at 10 degrees with respect to a horizontal plane passing through the center of the light distribution element, and so on. As can be seen from the figure, the lighting patterns P viewed from different angles are different, and therefore, the patterns appear to have a three-dimensional stereoscopic effect.

In a preferred embodiment, a height of the petal-shaped convex 21 at the inner ring in a direction in which the petal-shaped convex 21 protrudes towards the outside of the light distribution element 2 is greater than or less than a height of the petal-shaped convex 21 at the outer ring in the direction in which the petal-shaped convex 21 protrudes towards the outside of the light distribution element 2. Specifically, the height of the petal-shaped convex 21 between the inner ring and the outer ring in the direction in which the petal-shaped convex 21 protrudes towards the outside of the light distribution element 2 gradually changes. Alternatively, the height of the petal-shaped convex 21 between the inner ring and the outer ring in the direction in which the petal-shaped convex 21 protrudes towards the outside of the light distribution element 2 has step changes. Similarly, a height of the annular convex 22 having a larger perimeter in a direction in which the petal-shaped convex 21 protrudes towards the outside of the light distribution element 2 is greater than or less than a height of the annular convex 22 having a smaller perimeter in the direction in which the annular convex 22 protrudes towards the outside of the light distribution element 2. Specifically, the heights of the plurality of annular convexes 22 in the direction in which the annular convexes 22 protrude towards the outside of the light distribution element 2 gradually change in a radially outward direction from a circle center of the light entrance side or the light exit side. Alternatively, the heights of the plurality of annular convexes 22 can have step changes in the radially outward direction from the circle center of the light entrance side or the light exit side.

The different heights of the plurality of petal-shaped convexes 21 and/or the different heights of the plurality of annular convexes 22 will generate a lighting pattern with more significant stereoscopic effect.

The light distribution element 2 may be made of transparent glass, resin or plastic material, such as PMMA (polymethyl methacrylate), and the plurality of first light deflecting portions and the plurality of second light deflecting portions may be integrally formed with a main body of the light distribution element 2. The plurality of first light deflecting portions and the plurality of second light deflecting portions may be respectively constructed to be a lenticular grating film, such that the plurality of first light deflecting portions and the plurality of second light deflecting portion are constructed to be members independent of the main body of the light distribution element 2.

Figure 10:
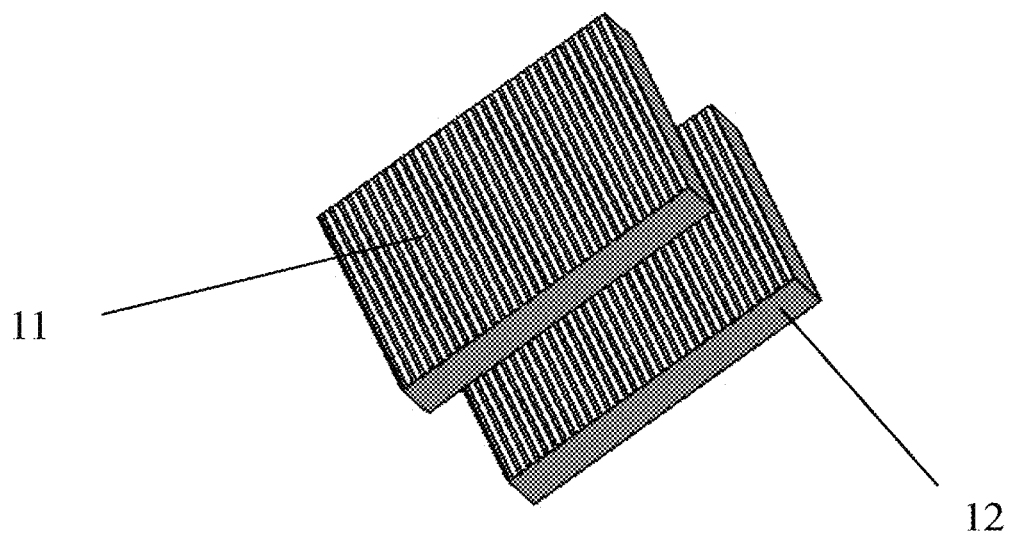
FIG. 10 exemplarily shows relatively independent first and second light deflecting portions.
Figure 11:
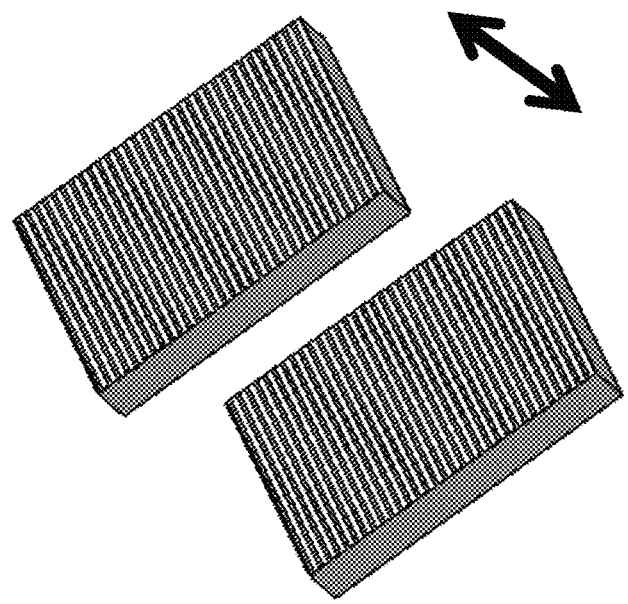
FIG. 11 exemplarily shows a first example in which a first light deflecting portion and a second light deflecting portion are translated with respect to each other.
Figure 12:
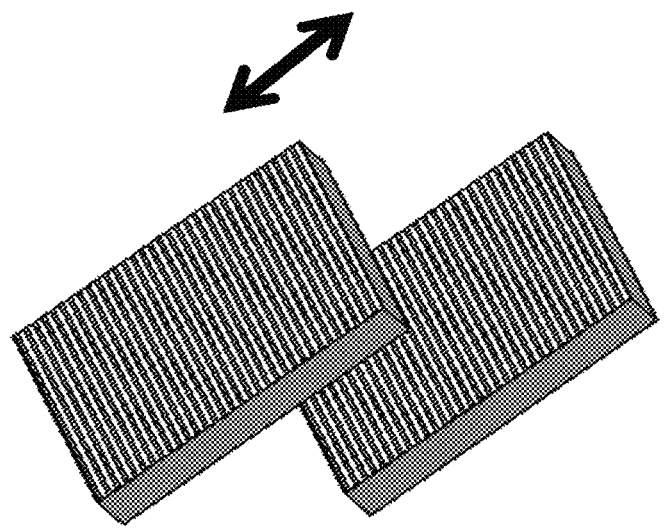
FIG. 12 exemplarily shows a second example in which a first light deflecting portion and a second light deflecting portion are translated with respect to each other.
Figure 13:
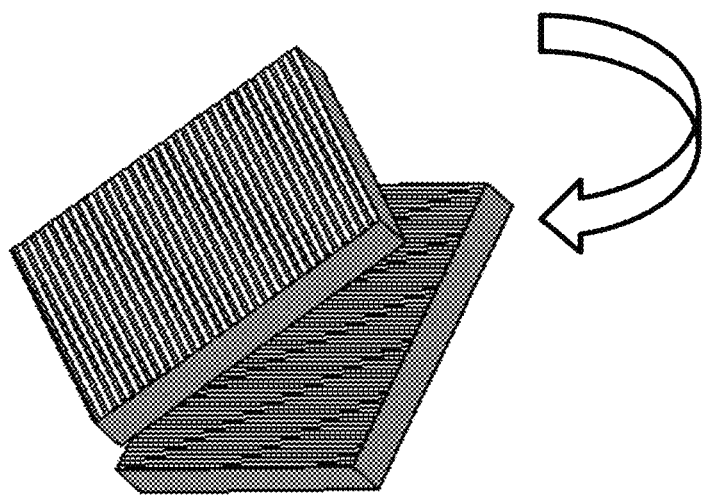
FIG. 13 exemplarily shows an example in which a first light deflecting portion and a second light deflecting portion are rotated with respect to each other.

In a case where the first light deflecting portions and the second light deflecting portions are relatively independent, the plurality of first light deflecting portions and the plurality of second light deflecting portions may be configured to be movable with respect to each other, for example, the first light deflecting portions may be moved with respect to the second light deflecting portions by the driving of a motor. Specifically, the plurality of first light deflecting portions and the plurality of second light deflecting portions are configured to be translatable with respect to each other, so that a distance between the plurality of first light deflecting portions and the plurality of second light deflecting portions is changeable. Alternatively, the plurality of first light deflecting portions and the plurality of second light deflecting portions are configured to be rotatable with respect to each other. FIGS. 10-13 exemplarily show relative translation and rotation between the first light deflecting portion and the second light deflecting portion by taking lenticular gratings as an example. In FIG. 10, the first light deflecting portion 11 and the second light deflecting portion 12 are relatively independent of each other. The first light deflecting portion 11 and the second light deflecting portion 12 can be translated with respect to each other in a direction away from each other, as shown in FIG. 11. Alternatively, the first light deflecting portion 11 and the second light deflecting portion 12 can be translated in parallel with respect to each other, as shown in FIG. 12. Further, in FIG. 13, the second light deflecting portion 12 is configured to be rotatable with respect to the first light deflecting portion 11.

By means of the provision that the first light deflecting portion and the second light deflecting portion are configured to move with respect to each other, the formed pattern dynamically changes during the movement accordingly. Therefore, by using the light distribution element provided by the present invention, the light emitting device can generate a dynamic lighting effect.

According to another aspect of the present invention, there is provided a light emitting device comprising the light distribution element 2 for the light emitting device according to any one of the preceding embodiments.

In the present invention, a personalized lighting pattern, a stereoscopic lighting effect or a dynamic lighting effect can be simply realized by using differently constructed light deflecting portions, and the technical means is simple and cost-effective.

While the embodiments of the present invention have been shown and described, variations and modifications may be made to these embodiments by those skilled in the art without departing from the principles and spirit of the present invention. The scope of the present invention is defined by the appended claims and equivalents thereof.

REFERENCE NUMERAL LIST 1 light source
2 light distribution element
21 petal-shaped convex
22 annular convex
100 lenticular grating
101 convex
102 horizontal convex
103 vertical convex
d grating pitch
I image
L light
L1 incident light beam
L2 emergent light beam
R lighting region
E lighting boundary
P lighting pattern
11 first light deflecting portion
12 second light deflecting portion

What is claimed is:

1. A light distribution element for a light emitting device, comprising
a plurality of first light deflecting portions; and
a plurality of second light deflecting portions, wherein
the plurality of first light deflecting portions are constructed to be a plurality of petal-shaped convexes protruding towards an outside of the light distribution element, the plurality of petal-shaped convexes extending radially outward from a middle of the light distribution element,
the plurality of second light deflecting portions are constructed to be a plurality of annular convexes protruding towards the outside of the light distribution element, the plurality of annular convexes having different perimeters, an annular convex having a larger perimeter being provided outside an annular convex having a smaller perimeter, and
a pattern formed by the plurality of first light deflecting portions is superposed with a pattern formed by the plurality of second light deflecting portions to form a final display pattern.

2. The light distribution element according to claim 1, wherein the plurality of first light deflecting portions and the plurality of second light deflecting portions are integrally formed with a main body of the light distribution element, and the plurality of first light deflecting portions and the plurality of second light deflecting portions are respectively disposed on a side of the main body of the light distribution element facing a light source and another side of the main body of the light distribution element facing away from the light source.

3. The light distribution element according to claim 1, wherein the plurality of first light deflecting portions are arranged in an annular region, and the plurality of petal-shaped convexes extend from an inner ring of the annular region to an outer ring of the annular region, respectively.

4. The light distribution element according to claim 3, wherein a height of each of the plurality of petal-shaped convexes at the inner ring, in a direction in which each of the plurality of petal-shaped convexes protrudes towards the outside of the light distribution element, is different from a height of each of the plurality of petal-shaped convexes at the outer ring, in the direction in which each of the plurality of petal-shaped convexes protrudes towards the outside of the light distribution element.

5. The light distribution element according to claim 4, wherein a height of each of the plurality of petal-shaped convexes between the inner ring and the outer ring, in the direction in which each of the plurality of petal-shaped convexes protrudes towards the outside of the light distribution element, gradually changes.

6. The light distribution element according to claim 1, wherein the light distribution element has a light entrance side and a light exit side parallel to the light entrance side, and
the plurality of first light deflecting portions are formed on the light entrance side of the light distribution element and the plurality of second light deflecting portions are formed on the light exit side of the light distribution element, or
the plurality of first light deflecting portions are formed on the light exit side of the light distribution element and the plurality of second light deflecting portions are formed on the light entrance side of the light distribution element.

7. The light distribution element according to claim 6, wherein profiles of the light entrance side and the light exit side are circular, and projections of the plurality of petal-shaped convexes on a plane where the light entrance side or the light exit side is located are distributed uniformly at equiangular intervals.

8. The light distribution element according to claim 7, wherein each of the projections of the plurality of petal-shaped convexes on the plane where the light entrance side or the light exit side is located is symmetrical or asymmetrical.

9. The light distribution element according to claim 6, wherein a height of each of the plurality of annular convexes having a larger perimeter, in a direction in which each of the plurality of petal-shaped convexes protrudes towards the outside of the light distribution element, is different from a height of each of the plurality of annular convexes having a smaller perimeter, in the direction in which each of the plurality of annular convexes protrudes towards the outside of the light distribution element.

10. The light distribution element according to claim 9, wherein profiles of the light entrance side and the light exit side are circular, and the heights of each of the plurality of annular convexes, in the direction in which the annular convexes protrude towards the outside of the light distribution element, gradually change in a radially outward direction from a circle center of the light entrance side or the light exit side.

11. The light distribution element according to claim 1, wherein the plurality of first light deflecting portions and the plurality of second light deflecting portions are constructed to be members independent of a main body of the light distribution element.

12. The light distribution element according to claim 11, wherein the plurality of first light deflecting portions and the plurality of second light deflecting portions are respectively constructed to be a lenticular grating film.

13. The light distribution element according to claim 11, wherein the plurality of first light deflecting portions and the plurality of second light deflecting portions are configured to be movable with respect to each other.

14. The light distribution element according to claim 13, wherein the plurality of first light deflecting portions and the plurality of second light deflecting portions are configured to be rotatable with respect to each other.

15. The light distribution element according to claim 13, wherein the plurality of first light deflecting portions and the plurality of second light deflecting portions are configured to be translatable with respect to each other, so that a distance between the plurality of first light deflecting portions and the plurality of second light deflecting portions is changeable.

16. A light emitting device, comprising:
  a light source; and
  a light distribution element including
    a plurality of first light deflecting portions; and
    a plurality of second light deflecting portions, wherein
    the plurality of first light deflecting portions are constructed to be a plurality of petal-shaped convexes protruding towards an outside of the light distribution element, the plurality of petal-shaped convexes extending radially outward from a middle of the light distribution element,
    the plurality of second light deflecting portions are constructed to be a plurality of annular convexes protruding towards the outside of the light distribution element, the plurality of annular convexes having different perimeters, an annular convex having a larger perimeter being provided outside an annular convex having a smaller perimeter, and
    a pattern formed by the plurality of first light deflecting portions is superposed with a pattern formed by the plurality of second light deflecting portions to form a final display pattern.

17. The light emitting device according to claim 16, wherein the plurality of first light deflecting portions and the plurality of second light deflecting portions are integrally formed with a main body of the light distribution element, and the plurality of first light deflecting portions and the plurality of second light deflecting portions are respectively disposed on a side of the main body of the light distribution element facing the light source and another side of the main body of the light distribution element facing away from the light source.

18. The light emitting device according to claim 16, wherein the plurality of first light deflecting portions and the plurality of second light deflecting portions are constructed to be members independent of a main body of the light distribution element.

19. A light emitting device, comprising:
  a light source; and
  a light distribution element including
    a plurality of first light deflecting portions; and
    a plurality of second light deflecting portions, the plurality of first light deflecting portions and the plurality of second light deflecting portions being movable with respect to each other, wherein
    the plurality of first light deflecting portions and the plurality of second light deflecting portions are constructed to be members independent of a main body of the light distribution element, and
    a pattern formed by the plurality of first light deflecting portions is superposed with a pattern formed by the plurality of second light deflecting portions to form a final display pattern.

20. The light emitting device according to claim 19, wherein
  the plurality of first light deflecting portions are constructed to be a plurality of petal-shaped convexes protruding towards an outside of the light distribution element, the plurality of petal-shaped convexes extending radially outward from a middle of the light distribution element, and
  the plurality of second light deflecting portions are constructed to be a plurality of annular convexes protruding towards the outside of the light distribution element, the plurality of annular convexes having different perimeters, an annular convex having a larger perimeter being provided outside an annular convex having a smaller perimeter.

* * * * *